United States Patent [19]

Kurihara et al.

[11] Patent Number: 5,496,618
[45] Date of Patent: Mar. 5, 1996

[54] POLYESTER FILM FOR MAGNETIC RECORDING MEDIA, PROCESS FOR PREPARATION THEREOF AND MAGNETIC RECORDING MEDIUM

[75] Inventors: Hideshi Kurihara, Sagamihara; Sadayoshi Miura, Yamato; Tsuyoshi Nagai, Sagamihara, all of Japan

[73] Assignee: Teijin Limited, Osaka, Japan

[21] Appl. No.: 250,115

[22] Filed: May 26, 1994

Related U.S. Application Data

[63] Continuation of Ser. No. 903,323, Jun. 24, 1992, abandoned.

[30] Foreign Application Priority Data

Jun. 28, 1991 [JP] Japan .................... 3-183913

[51] Int. Cl.⁶ .................................................. B32B 27/14
[52] U.S. Cl. .................... 428/198; 428/201; 428/206; 428/323; 428/336; 428/407; 428/458; 428/694 TR; 428/694 SG; 428/910
[58] Field of Search .................... 428/144, 147, 428/323, 403, 407, 694 TR, 694 TS, 694 ST, 694 SG, 480, 910, 198, 201, 206, 336, 458

[56] References Cited

U.S. PATENT DOCUMENTS

| | | | |
|---|---|---|---|
| 3,787,327 | 1/1974 | Emrick | 252/316 |
| 4,135,031 | 1/1979 | Akashi et al. | 428/323 |
| 4,540,618 | 9/1985 | Suzuki et al. | 428/141 |
| 4,564,549 | 1/1986 | Suzuki et al. | 428/141 |
| 4,578,729 | 3/1986 | Suzuki et al. | 428/172 X |
| 4,645,703 | 2/1987 | Suzuki et al. | 428/141 |
| 4,670,319 | 6/1987 | Katoh et al. | 428/141 |
| 4,688,130 | 8/1987 | Nakanouchi et al. | 428/694 X |
| 4,732,814 | 2/1988 | Hatada et al. | 428/480 |
| 4,735,848 | 4/1988 | Kondo et al. | 428/219 |
| 4,818,581 | 4/1989 | Katoh et al. | 428/143 |
| 5,051,292 | 9/1991 | Katoh et al. | 428/141 |
| 5,085,915 | 2/1992 | Taga et al. | 428/141 |
| 5,328,745 | 7/1994 | Kurihara et al. | 428/141 |

FOREIGN PATENT DOCUMENTS

| | | |
|---|---|---|
| 77549 | 12/1981 | European Pat. Off. . |
| 0101080 | 2/1984 | European Pat. Off. . |
| 134706 | 11/1977 | Japan . |
| 54-147010 | 11/1979 | Japan . |
| 58-68227 | 4/1983 | Japan . |
| 58-100221 | 6/1983 | Japan . |
| 59-30231 | 2/1984 | Japan . |
| 59-48825 | 3/1984 | Japan . |
| 59-92428 | 5/1984 | Japan . |
| 59-84928 | 5/1984 | Japan . |
| 59-84927 | 5/1984 | Japan . |
| 59-229316 | 12/1984 | Japan . |
| 60-063150 | 4/1985 | Japan . |

*Primary Examiner*—D. S. Nakarani
*Assistant Examiner*—H. Thi Le
*Attorney, Agent, or Firm*—Wenderoth, Lind & Ponack

[57] ABSTRACT

A polyester film for magnetic recording media, a process for preparation thereof and a magnetic recording medium comprising the film having formed on the surface of a ferromagnetic metallic thin membrane, said polyester film being one wherein on the surface of one side or both sides of the film, (i) fine protuberances having an average height of 0.15 μm or less exist at a rate of $1.0 \times 10^4$ to $1.0 \times 10^8$ per mm², (ii) the fine protuberances are composed of fine particles whose surface is coated with a binder resin, (iii) the fine protuberances are stuck on the film surface by the binder resin, (iv) the binder resin does not substantially exist on the film surface other than in the vicinity of the film surface where the fine protuberances exist, and (v) the average surface roughness (Ra) of the film surface is in the range of 0.001 to 0.01 μm.

10 Claims, 1 Drawing Sheet

POLYESTER FILM FOR MAGNETIC RECORDING MEDIA, PROCESS FOR PREPARATION THEREOF AND MAGNETIC RECORDING MEDIUM

This application is a continuation of now abandoned application Ser. No. 07/903,323, filed Jun. 24, 1992.

DETAILED DESCRIPTION OF THE INVENTION

1. Industrially Applicable Field

This invention relates to a polyester film for magnetic recording media, a process for preparation thereof and a magnetic recording medium. More specifically, this invention relates to a magnetic recording medium excellent in running properties, electromagnetic conversion characteristics, and durability in preservation, and a polyester film used therefor and a process for preparation of the film.

2. Prior Art

As high density magnetic recording media, ferromagnetic metallic thin membrane magnetic recording media are known which each comprise a nonmagnetic substrate having formed thereon a ferromagnetic metallic thin membrane by a physical deposition method such as vacuum deposition or sputtering or a plating method. For example, there are known a magnetic tape comprising a film having vapor deposited Co thereon (Japanese Laid-Open Patent Publication No. 147010/1979), a vertical magnetic recording medium wherein a Co-Cr alloy is used (Japanese Laid-Open Patent Publication No. 134706/1977), etc. Such a metallic thin membrane formed by a thin membrane formation means such as vapor deposition, sputtering or ion plating has an advantage that its thickness is as thin as 1.5 μm or less, and nevertheless it has performances equal to or more than those of a coating type magnetic recording medium (a magnetic recording medium comprising a nonmagnetic substrate having applied thereon magnetic substance powder mixed into an organic high molecular binder) wherein the thickness of the magnetic recording layer is 3 μm or more.

By the way, it has been considered that the coercive force (Hc) as a static characteristic or magnetic characteristics such as the rectangular ratio of hysteresis loop of magnetic recording media do not much depend on the surface state of the nonmagnetic substrates used. Based on this conception, a Co-Cr multilayer structure by vacuum deposition is disclosed in U.S. Pat. No. 3,787,327.

However, in case of a metallic thin membrane type magnetic recording medium, it has a disadvantage that since the thickness of the metallic thin membrane formed on the nonmagnetic substrate surface is extremely thin, the surface state (surface irregularities) of the nonmagnetic substrate (film) is expressed, as it is, as irregularities of the surface of the magnetic recording layer and becomes a cause of noise.

In view of noise, it is preferred that the surface state of the nonmagnetic substrate (film) be as smooth as possible. On the other hand, in view of handling such as winding or unwinding of the base film, if the film surface is smooth, slip properties between film and film are bad, blocking phenomenon occurs and thus such a magnetic recording medium cannot become a product, and therefore it is required that the base film surface is rough. Thus, in view of electromagnetic conversion characteristics, smoothness of the surface of the non-magnetic substrate is required, and on the other hand, in view of handling, roughness of the surface is required. Therefore, it is required to satisfy the antinomic properties of both of them at the same time.

Further, as for metallic thin membrane magnetic recording media, there is the problem of running properties of the metallic thin membrane side as an important problem at the time of actual use. The usual case of a coating type magnetic recording medium comprising a base film having applied thereon magnetic substance powder mixed into an organic high molecular binder, the running properties of the magnetic side can be improved by dispersing a slip agent in the binder. However, in the case of a metallic thin membrane magnetic recording medium, such a solution method cannot be used, it is very difficult to maintain running properties stable, and particularly, it had disadvantages, e.g., that running properties at the time of high temperature and high humidity are poor.

In order to improve this disadvantage, it is proposed in Japanese Patent Publication No. 30105/1987 to form on the film surface protuberances composed of fine particles, a water soluble resin and a silane coupling agent, and it is proposed in Japanese Patent Publication No. 30106/1987 and Japanese Laid-Open Patent Publication No. 229316/1984 to form on the film surface protuberances composed of fine particles and a water soluble resin. However, in all the products, the fine particles exist in the trapezoidal protuberances of the water soluble resins, and do not uniformly exist on the film surface.

In Japanese Laid-Open Patent Publication No. 63150/1985, it is proposed to form two kinds of protuberances on the film surface, larger and smaller. However, as is seen from the examples, these protuberances are mainly formed by fine destruction of the high molecular membrane, and thus there is a problem in the uniformity and reproducibility of the film surface.

On the other hand, it has been proposed, as described below, to form particulate protuberances on the film surface using fine particles as nuclei and a resin as a binder.

(i) Japanese Laid-Open Patent Publication No. 30231/1984

A magnetic recording medium which comprises a plastic film wherein particulate resin protuberances each containing as a nucleus a fine particle of a thermoplastic resin and having a particle height of 30 to 500 Å were made to exist on the surface in a number of 1,000 per $mm^2$ or more, having formed on the surface of the plastic film a ferromagnetic metallic thin membrane having made a slip agent exist thereon.

(ii) Japanese Laid-Open Patent Publication No. 48825/1984

A magnetic recording medium which comprises a plastic film substrate having provided thereon an undercoat layer containing $1000/mm^2$ or more of particulate protuberances which each comprises a silica fine particle as a nucleus and a resin as a binder and have a particle height of 30 to 500 Å, having formed on the undercoat layer a ferromagnetic metallic thin membrane having further made a slip agent exist on the metallic thin membrane.

(iii) Japanese Laid-Open Patent Publication No. 92428/1984

A magnetic recording medium which comprises a plastic film having provided on the surface thereof an undercoat layer containing particulate protuberances which comprise as nuclei a mixture of two kinds of fine particles having average heights of 30 to 200 Å and 100 to 600 Å and a resin as a binder, having formed on the undercoat layer a ferromagnetic metallic thin membrane.

(iv) European Patent No. 0077549B1, Japanese Laid-Open Patent Publication No. 68227/1983 and Japanese Laid-Open Patent Publication No. 100221/1983

A magnetic recording medium, comprising a plastic film over the surface or surfaces of which a thin ferromagnetic film is formed as a magnetic layer, said surface or surfaces being imparted with protuberant or rumple-or worm-like nodules, characterized in that into said protuberant or rumple-or worm-like nodules finely divided particles of the diameter between 0.01 and 0.2 µm are dispersed.

(v) U.S. Pat. No. 4,578,729

A magnetic recording medium comprising a thin ferromagnetic metal film formed as a magnetic layer; and strip protrusions having a height between 100 and 2,000 Å distributed over the surface of said magnetic layer at an average density ranging from $10^4$ to $10^6$ protrusions per $mm^2$, and the ratio between the length and the height of said protrusions is less than 10:1.

(vi) U.S. Pat. No. 4,688,130

A perpendicular magnetic recording medium comprising:
a substrate having $5 \times 10^5$–$5 \times 10^9$ fine projections per $mm^2$ formed on and projecting from the surface thereof, said projections having heights in the range of 0.01–10 µm and diameters in the range of 0.01–10 µm; and
fine particles of a ferromagnetic material deposited onto each of the projections uniformly in a columnar structure, said columnar structure extending perpendicular to said surface and being substantially isolated from each other with their axes of easy magnetization also extending perpendicularly to said surface.

(vii) U.S. Pat. No. 4,645,703

A magnetic recording medium comprising: a substrate of non-ferromagnetic characteristic, and a ferromagnetic thin film, formed on said substrate, characterized by protrusions of mountain-shape having 50–600 Å heights and distributed with numbers of $1 \times 10^5$– $1 \times 10^8$ protrusions per 1 $mm^2$ on a surface of said ferromagnetic thin film, and
a lubricant layer formed on said ferromagnetic thin film.

(viii) U.S. Pat. No. 4,540,618

A magnetic recording medium comprising; a substrate of plastic film an undercoating layer having 1000/$mm^2$ or more minute granular protrusions of 30 to 500 Å in height provided that the lateral spread is in the range of 1:1 to 20:1, said undercoating layer being formed as a coating on the face of said substrate,
a ferromagnetic thin film formed on said undercoating layer, and
a lubrication layer formed on said ferromagnetic thin film wherein said granular protrusions comprise nuclei of at least one substance selected from the group consisting of a thermoplastic resin, a crosslinked resin, carbon, an oxide of a metal and the hydrolysis product of a metal alkoxide.

(ix) U.S. Pat. No. 4,564,549

A magnetic recording medium characterized in that a thin film of ferromagnetic metal containing oxygen is formed over the surface of an elongated polyester film which is coated with worm-like or particle-like projections comprising a cured high-molecular weight compound having a surface roughness, $R_{max}$, of 0.003 to 0.1 micrometers and wherein the back surface of said film also has worm-like or particle-like projections comprising a cured high-molecular weight compound and is further formed with a thin film of a high-molecular weight compound containing a lubricant.

(x) U.S. Pat. No. 4,732,814

A biaxially stretched polyester film having a multiplicity of elongated and directionally arranged ultrafine protrusions on the surface thereof, wherein said protrusions have a height of 50 to 300 angstroms and a width of 100 to 300 angstroms and 1 to 20 protrusions are present per µm of the surface length as observed on a cross-section perpendicular to the direction of the arrangement of the protrusions, said protrusions being an integral part of the polyester film and tightly adherent thereto and being dyeable with osmic acid, and said film having a static friction coefficient (µs) of 0.3 to 3.0.

(xi) U.S. Pat. No. 4,735,848

A magnetic recording medium comprising a non-magnetic base, a thin film metal magnetic layer formed on said non-magnetic base, a first layer containing a rust preventive formed on said magnetic layer and a second layer containing a lubricant formed on said first layer, said second layer containing a carboxylic acid perfluoroalkyl ester represented by the following general formula:

$RCOO(CH_2)_j C_k F_{2k+1}$ where R is a hydrocarbon residue, j is an integer and may be 0, and k is an integer not less than 4, said second layer also containing an extreme pressure agent selected from the group consisting of phosphorus containing, sulfur containing, halogen containing, and organo metallic extreme pressure agents, and composite type extreme pressure agents.

(xii) U.S. Pat. No. 4,135,031

A magnetic recording substance comprising a non-magnetic support film having a magnetic recording layer on one side and a back coating comprising a thin layer of a resinous binder having dispersed therein a mixture of inorganic powders comprising as a major component an inorganic powder having grain size of 0.02–5 microns and as a minor component an inorganic powder having a grain size of 2–40 microns, said minor component forming with said major component and binder on said film a coating having spike grains extending outwardly from the non-magnetic surface to a height of 0.8–5 microns at a pitch of at least 200 microns to yield a tape having a coefficient of friction of at least 0.25.

However, in the above techniques so far known, there is a problem that even if the size and volume of the fine particles can be controlled, formation of protuberances of the binder resin itself cannot be avoided, in addition to formation of particulate protuberances, on the film surface, and moreover, as for formation of protuberances of the resin itself, control of their size and volume is extremely difficult.

Problems to be Solved by the Invention

The object of this invention lies in providing a magnetic recording medium free of the aforementioned drawbacks of the usual techniques and excellent in running properties, electromagnetic conversion characteristics, etc., particularly a metallic thin membrane magnetic recording medium, a polyester film used therefor and a process for preparation thereof.

Specifically, the object of this invention lies in providing a polyester film wherein, on the film surface, the number of protuberances based on the binder resin itself are as small as possible and, in other words substantially only protuberances based on the fine particles are formed; a method for preparation thereof; and a magnetic recording medium from the film.

Means for Solving the Problems

According to research by the present inventors, it was revealed that the above object of this invention can be attained by a polyester film for magnetic recording media wherein on the surface of one side or both sides of the film, (i) fine protuberances having an average height of 0.15 μm or less exist at a rate of $1.0 \times 10^4$ to $1.0 \times 10^8$ per $mm^2$, (ii) the fine protuberances are composed of fine particles whose surface is coated with a binder resin, (iii) the fine protuberances are stuck on the film surface by the binder resin, (iv) the binder resin does not substantially exist on the film surface other than in the vicinity of the film surface where the fine protuberances exist, and (v) the average surface roughness (Ra) of the film surface is in the range of 0.001 to 0.01 μm, and can further be attained by a magnetic recording medium which comprises a polyester film having the above characteristics having formed on its surface a ferromagnetic metallic thin membrane.

Hereafter, this invention is described in more detail.

In this invention, the polyester forming the polyester film is a linear saturated polyester synthesized from an aromatic dibasic acid or an ester forming derivative thereof with a diol or an ester forming derivative thereof. Specific examples of such polyesters are polyethylene terephthalate, polyethylene isophthalate, polybutylene terephthalate, poly(1,4-cyclohexylenedimethylene terephthalate), polyethylene-2,6-naphthalenedicarboxylate, etc., and further include their copolymers or blends of them with other resins in a small ratio, etc. Among these polyesters, polyethylene terephthalate and polyethylene-2,6-naphthalenedicarboxylate, especially polyethylene terephthalate are preferred for accomplishment of the object of this invention.

According to conventional methods, the above polyester is melt-extruded, biaxially stretched and oriented, and heat-set to obtain a film. The biaxial stretching can be carried out by a biaxial stretching method such as, for example, a consecutive biaxial stretching method or a simultaneous biaxial stretching method. This biaxially oriented polyester film usually has such a characteristic of orientation of crystals that its heat of fusion measured, using a differential scanning calorimeter, under a nitrogen atmosphere at a heating rate of 10° C./min is 4 cal/g or more. The thickness of the film after orientation by stretching is in the range of generally 3 to 100 μm, preferably 4 to 50 μm.

The polyester film of this invention has on the surface of one side or both sides fine protuberances having an average height of 0.15 μm or less, preferably 0.1 μm or less and existing in a number of $1.0 \times 10^4$ to $1.0 \times 10^8/mm^2$, preferably $1.0 \times 10^5$ to $8.0 \times 10^7/mm^2$, and has a surface roughness Ra of 0.001 to 0.1 μm, preferably 0.001 to 0.007 μm. The fine protuberances are fine particles coated with a resin as a binder, and stuck on the film surface with the binder resin.

In the polyester film of this invention, the above fine protuberances based on the fine particles exist on its surface, and fine protuberances formed only of the binder resin do not substantially exist, and the binder resin does not substantially exist except in the vicinity of the film surface where the fine protuberances based on the fine particles exist. Thus, the polyester film of this invention has a characteristic that, on the surface thereof, there are formed protuberances substantially consisting of the fine protuberances comprising the fine particles coated with the binder resin, and other protuberances and resins do not substantially exist.

Since substantially all of the fine protuberances on the surface of the polyester film of this invention derive from fine particles coated with the binder resin, the size, shape and number of the fine protuberances can be controlled accurately, and therefore, the polyester film can be said to be a film having a surface extremely excellent in uniformity. The number of the fine protuberances on the film surface can be counted using a scanning type electron microscope, and is a value obtained by counting the number of protuberances having a height from the surface of 0.005 μm or more.

Fine particles existing in the above fine protuberances in this invention can be any of fine particles of organic substances such as polystyrene, polymethyl methacrylate, a methyl methacrylate copolymer, a crosslinked methyl methacrylate copolymer, polytetrafluoroethylene, polyvinilidene fluoride, polyacrylonitrile and a benzoguanamine resin; and fine particles of inorganic substances such as silica, alumina, titanium dioxide, kaolin, talc, graphite, calcium carbonate, feldspar, molybdenum disulfide, carbon black and barium sulfate. Preferably, these fine particles have an average particle size of 0.1 μm or less. These fine particles have, particularly preferably, an average particle size in the range of 0.003 to 0.06 μm, and it is desirable that the change of the particle size is small. For example, it is preferred that the particle size is such that the value of relative standard deviation represented by the following equation is 0.5 or less, more preferably 0.4 or less, particularly preferably 0.3 or less.

$$\text{Relative standard deviation} = \sqrt{\frac{\sum_{i=1}^{n}(Di - \bar{D})}{n}} \bigg/ \bar{D}$$

wherein Di=circle-equivalent diameter of each particle $\bar{D}$ = average value of the circle-equivalent diameters $= \left( \sum_{i=1}^{n} Di/n \right)$ As the above fine particles, monodispersed ones are used in view of its purpose. Aggregates are not suitable because control of its size is difficult.

As resins (binders) used for covering the above fine particles and sticking the fine protuberances on the surface of the polyester film, there can be exemplified alkyd resins, unsaturated polyester resins, saturated polyester resins, phenol resins, epoxy resins, amino resins, polyurethane resins, vinyl acetate resins, vinyl chloride-vinyl acetate copolymer resins, acrylic resins, acrylic-polyester resins, etc. These may be homopolymers or copolymers, or mixtures. Preferred among them are acrylic resins, saturated polyester resins and acrylic-polyester resins. These preferred resins are described in more detail below.

The above "acrylic resins" are those prepared from combinations of monomers, for example, acrylic esters (as alcohol residues, there can be exemplified a methyl group, an ethyl group, a n-propyl group, an isopropyl group, a n-butyl group, an isobutyl group, a t-butyl group, a 2-ethylhexyl group, a cyclohexyl group, a phenyl group, a benzyl group, a phenylethyl group, etc.); methacrylic esters (alcohol residues are the same as above); hydroxyl-containing monomers such as 2-hydroxyethyl acrylate, 2-hydroxyethyl methacrylate, 2-hydroxypropyl acrylate and 2-hydroxypropyl methacrylate; amido group-containing monomers such as acrylamide, methacrylamide, N-methylmethacrylamide, N-methylacrylamide, N-methylolacrylamide, N-methylolmethacrylamide, N,N-dimethylolacrylamide, N-methoxymethylacrylamide, N-methoxymethylmethacrylamide and N-phenylacrylamide; amino group-containing monomers such as N,N-diethylaminoethyl acrylate and N,N-diethylaminoethyl methacrylate; epoxy group-containing monomers such as glycidyl acrylate, glycidyl methacrylate and allyl glycidyl ether; monomers containing a sulfonic acid group or a salt thereof such as styrenesulfonic acid and vinylsulfonic acid and their salts (e.g., sodium salts, potassium salts, ammonium salts, etc.); monomers containing carboxyl group(s) or a salt thereof such as crotonic acid, itaconic acid, acrylic acid, maleic acid and fumaric acid and their salts (e.g., sodium salts, potassium salts, ammonium salts, etc.); anhydride-containing monomers such as maleic anhydride and itaconic anhydride; and further vinyl isocyanate, allyl isocyanate, styrene, vinyl methyl ether, vinyl ethyl ether, vinyltris(alkoxy)silanes, alkylmaleic acid monoesters, alkylfumaric acid monoesters, acrylonitrile, methacrylonitrile, alkyltaconic acid monoesters, vinylidene chloride, vinyl acetate and vinyl chloride. Preferred among them are those containing as a component a (meth)acrylic monomer such as an acrylic acid derivative or a methacrylic acid derivative in a ratio of 50 mol % or more, and particularly preferred are those containing methyl methacrylate as a component.

Further, as acid components constituting the above "saturated polyester resins", there can be exemplified polyvalent carboxylic acids such as, for example, terephthalic acid, isophthalic acid, phthalic acid, 1,4-cyclohexanedicarboxylic acid, 2,6-naphthlenedicarboxylic acid, 4,4'-diphenyldicarboxylic acid, adipic acid, sebacic acid, dodecanedicarboxylic acid, succinic acid, sodium isophthalic acid-5-sulfonate, potassium terephthalic acid-2-sulfonate, trimellitic acid, trimesic acid, trimellitic anhydride, phthalic anhydride, p-hydroxybenzoic acid and monopotassium trimellitate. Further, as hydroxy compound components, there can be exemplified polyvalent hydroxy compounds such as, for example, ethylene glycol, propylene glycol, 1,3-propanediol, 1,4-butanediol, 1,6-hexanediol, neopentyl glycol, 1,4-cyclohexanedimethanol, p-xylene glycol, ethylene oxide adducts of bisphenol A, diethylene glycol, triethylene glycol, dimethylolpropionic acid, glycerol, trimethylolpropane, sodium dimethylolethylsulfonate and potassium dimethylolpropionate. Polyester resins can be prepared from these compounds by a conventional method.

Further, the above "acrylic-polyester resins" included the forms of acrylic-modified polyester resins and polyester-modified acrylic resins, are those wherein an acrylic resin component and a polyester resin component are mutually bound, and include, for example, those of a graft type, those of a block type, etc. An acrylic-polyester resin can, for example, be prepared by binding a radical initiator to both ends of a polyester resin and carrying out polymerization of an acrylic monomer, by binding a radical initiator to the side chains of a polyester resin and carrying out polymerization of an acrylic monomer, or by binding a hydroxyl group to the side chains of an acrylic resin and reacting it with a polyester having an isocyanato group or a carboxyl group to give a comb-shaped polymer.

As the aforesaid binder resin is preferred one having good adhesion to the polyester film and capable of softening at a temperature lower than the melting point of the polyester forming the film. Particularly preferred is one having such adhesion and softening point that fine protuberances stuck on the surface of the polyester film are formed in the drying step or heat-setting step in the later-described process for preparation of the polyester film of this invention. For example, it is preferred that the softening point is in the range of 80° to 240° C.

As a method to coat the surface of the fine particles with the resin (binder), there can be used a method to carry out coating with the polymer by an emulsion polymerization or dispersion polymerization method using the fine particles as nuclei, a method to add dropwise the fine particles into a suitable polymer solution or suspension to coat the surface of the fine particles, or the like. Preferred among them is the method of carrying out polymer coating by emulsion polymerization or dispersion polymerization using the fine particles as nuclei, in order to avoid formation of protuberances based only on the resin on the film surface. Resin-coated fine particles obtained by these methods are used for further steps after separation from the component consisting of the resin alone.

Preferably, the thus obtained fine particles coated with the resin as a binder have an average particle size of 0.15 μm or less. It is also preferred that the average particle size of the fine particles before coating with the resin is 0.1 μm or less.

According to research by the present inventors, it was found that the above-mentioned polyester film of this invention having fine protuberances on the surface can be prepared by applying onto the surface of one side or both sides of the polyester film a dispersion obtained by uniformly dissolving in a readily volatile liquid medium fine particles whose surface was coated with a binder resin; drying the resultant film, and then, if necessary, subjecting the film to stretching treatment and heat-setting treatment.

As a method to form fine protuberances on at least one surface of a polyester film in this invention, there can be adopted a method to apply onto the surface of the polyester film in a step for preparation of a polyester film a dispersion containing fine particles coated with a binder resin (coating liquid), preferably a water-dispersion, and then dry the film to stick the fine particles thereon; or a method to apply onto a biaxially oriented polyester film a dispersion containing fine particles coated with a binder resin (coating liquid), and then dry the film to stick the fine particles thereon; or the like, but the former method is preferred. It causes no inconvenience to add a surfactant into such a dispersion in order to make the coating easier.

Preferably, the above application of the dispersion in a step for preparation of a polyester film is made onto the surface of the polyester film before completion of orientation of crystals. Herein examples of the polyester film before completion of orientation of crystals include an unstretched film obtained by hot-melt extruding a polyester simply into film; a monoaxially stretched film wherein the unstretched film is oriented in any one direction of the longitudinal direction and the transverse direction; a biaxially stretched film such that although it is stretched in the biaxial directions, stretching in at least one of the directions is a low percent of stretching and thus further orientation with stretching at that direction is required (a biaxially stretched film before completion of orientation of crystals by final re-stretching in the longitudinal and/or transverse directions); etc.

The polyester film of this invention is, preferably, prepared by a so-called in-line coating method, namely by applying the above dispersion onto a polyester film unstretched or stretched in at least monoaxial direction before completion of orientation of crystals, and thereafter subjecting the film to longitudinal stretching and/or transverse stretching and heat-setting. In order to make possible smooth application of the dispersion onto the surface of the polyester film before completion of orientation of crystals, it is preferred either to subject the film surface to corona discharge treatment as a preliminary treatment or to add into the dispersion a surfactant chemically inert thereto. Such a surfactant can decrease the surface tension to 40 dyne/cm or less and thus promotes wetting of the polyester film, and there can, for example, be mentioned anionic and nonionic surfactants such as polyoxyethylene aklylphenyl ethers, polyoxyethylene fatty acid esters, sorbitan fatty acid esters, glycerol fatty acid esters, fatty acid metallic soaps, alkyl sulfates, salts of alkylsulfonic acids and salts of alkyl sulfosuccinates. Further, it is possible to mix into the dispersion other additives such as, for example, an antistatic agent, an ultraviolet absorber and a lubricant in such a range not to lose the effects of this invention.

In the process of this invention, the concentration of solid components in the dispersion, particularly in the water-dispersion is usually 30 weight % or less, preferably 15 weight % or less.

Further, the liquid medium forming the dispersion is, preferably, readily volatile, and its boiling point is 30° to 240° C., preferably 50° to 170° C. Further, it is preferred that the liquid medium does not dissolved the binder resin or the polyester or sparingly dissolves it. As liquid media, aqueous media are preferred, and for example, there can be mentioned water, methyl alcohol, ethyl alcohol, isopropyl alcohol, ethylene glycol, 1,2-propylene glycol, diethylamine, triethylamine, n-butylamine, acetone, methyl ethyl ketone, methyl isobutyl ketone, cyclohexanone, ethyl ether, methyl acetate, ethyl acetate, methyl formate, tetrahydrofuran, butylcellosolve, dioxane, dioxolan, xylene, etc.

As a method to apply the dispersion onto the surface of the polyester film, a method known per se is applied. For example, a roll coating method, a gravure coating method, a roll brush method, a spray coating method, an air-knife coating method, a dipping method, a curtain coating method, etc. may be applied singly or in combination.

Thus, a film can be obtained wherein fine protuberances exist on the surface thereof in a rate of $1.0 \times 10^4$ to $1.0 \times 10^8$ per $mm^2$, preferably $1.0 \times 10^5$ to $8.0 \times 10^7$ per $mm^2$ and which has a surface roughness Ra of 0.001 to 0.01 μm, preferably 0.001 to 0.007 μm. Provided that these conditions are satisfied, it does not cause any inconvenience at all to mix into the polyester film a rough surface-giving substance well known in the art such as, for example, calcium carbonate, kaolinite, titanium dioxide, silica or alumina.

It causes no inconvenience to carry out a treatment for securing slip properties such as, for example, coating or laminating of a polyester film containing a rough surface-giving substance onto the surface reverse to the surface of the polyester film on which a magnetic layer is formed, in such a range that the resultant coat, laminate or the like is not transferred onto the surface on which the magnetic layer is formed.

Preparation of a metallic thin membrane magnetic recording medium using the above polyester film of this invention can be carried out by a method known per se, for example by a method disclosed in Japanese Laid-Open Patent Publication No. 147010/1979 or Japanese Laid-Open Patent Publication No. 134706/1977, and specifically, a vacuum deposition method, an ion plating method and a sputtering method can preferably be used.

Metals forming metallic thin membranes are not particularly limited, but there can be mentioned cobalt, cobalt-nickel, cobalt-chromium, iron, etc.

The thickness of a metallic thin membrane formed on the surface of the polyester film is generally 0.01 to 0.6 μm.

The magnetic recording medium of this invention has on the surface of the polyester film a magnetic layer, particularly metallic thin membrane magnetic layer which is smooth and excellent in running properties and durability in preservation, and is a magnetic recording medium, particularly metallic thin membrane magnetic recording medium which has a characteristic of great decrease of noise and is extremely excellent in noise level, and is excellent in running properties of the magnetic surface, particularly metallic thin membrane surface.

BRIEF DESCRIPTION OF THE DRAWING

The drawing is a schematic drawing of an apparatus to measure a coefficient of dynamic friction for evaluation of film running properties. Numbers in the drawing have the following meanings, respectively.

1 feed reel
2 tension controller
3,5,6,8,9,11 free roller
4 tension detector (entrance)
7 fixed pin
10 tension detector (exit)
12 guide roller
13 winding reel Various characteristics in the present specification are defined or measured as follows:

(1) Intrinsic Viscosity [η]

Figure 1:
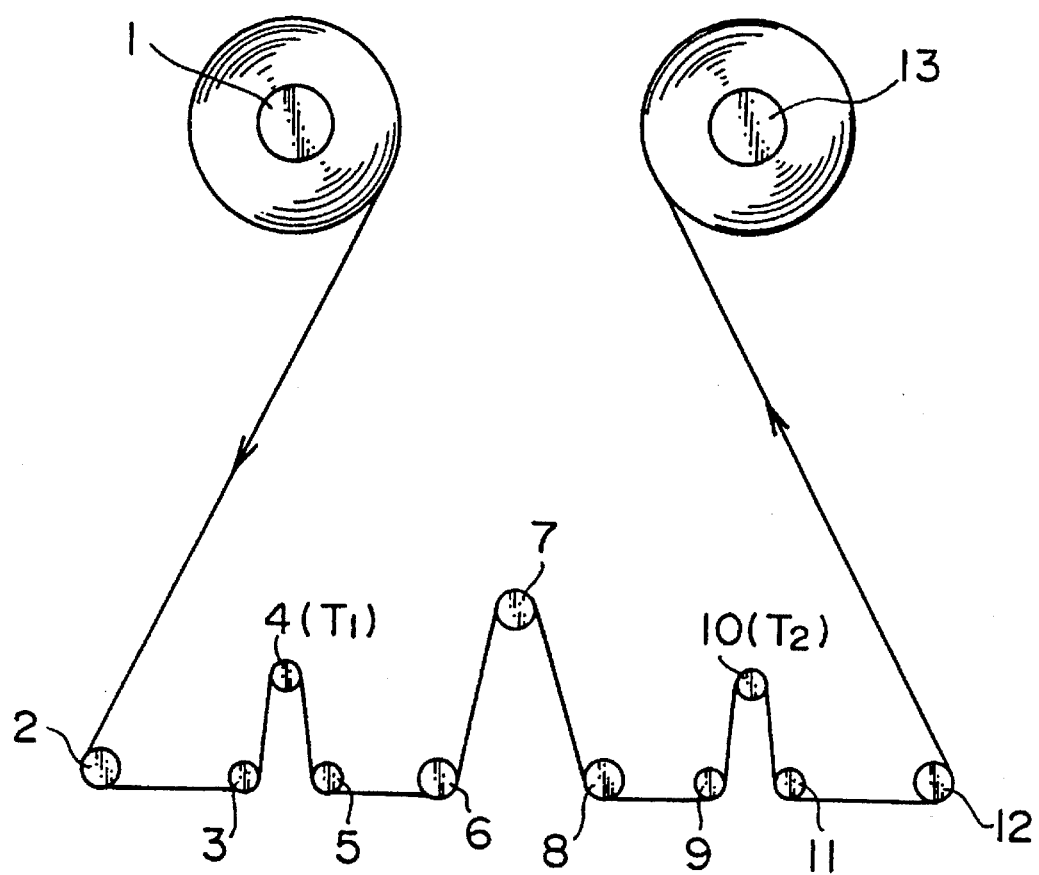

Determined from a value measured at 35° C. in an orthochlorophenol solvent.

(2) Average Particle Size of Particles

The circle-equivalent diameter of each particle is determined from the photograph of the particles by a scanning type electron microscope using an image analysis treatment apparatus (Luzex 500), and the average value of the circle-equivalent diameters of 100 particles is defined as the average particle size.

(3) Number of Protuberances on the Film Surface

Counted by a scanning type electron microscope.

(4) Surface Roughness Ra (Center Line Average)

A chart is depicted on a film sample under conditions of a radius of the stylus being 2 μm, a load of 30 mg, an enlarged magnification of 200,000-fold and a cut-off of 0.08 mm according to JIS B 0601 using a highly accurate surface roughness meter SE-3 FAT produced by Kosaka Laboratories Co., Ltd. A part of the film sample is picked up in a length of L from the surface roughness curve thus obtained in the direction toward a center line, and when the center line of the extracted part is defined as an X axis and an axis in the direction of longitudinal magnification as a Y axis and the surface roughness curve is expressed by a formula $Y=f(x)$, the value given by the following formula is expressed as by a μm unit.

$$Ra = \frac{1}{L}\int_0^L |f(x)|\,dx$$

This measurement is carried out on 4 film samples with setting the standard length to 1.25 mm, and Ra is expressed as the average value.

(5) Film Coefficient of Friction (Film Slipperiness)

A coefficient of static friction (µm) is measured according to ASTM D1894-63 using a slippery measurement apparatus produced by Toyo Tester Co., Ltd., provided that a glass plate is used as the sled plate and a load of 1 kg is applied.

Film slipperiness is judged based on the following criterion:

○: good (µs under 0.6)

Δ: somewhat inferior (µs 0.6 to 0.8)

X: inferior (µs 0.8 or more)

(6) Running Durability

The attached FIG. 1 is a schematic drawing of an apparatus for evaluation of film running properties. In FIG. 1, 1 represents a feed reel; 2 a tension controller; 3,5,6,8,9 and 11 free rollers; 4 a tension detector (entrance); 7 a chromium-plated fixed pin (5 mmø); 10 a tension detector (exit); 12 a guide roller; and 13 a winding reel, respectively.

As shown in FIG. 1, under an atmosphere of 20° C. and 60% RH, a film is contacted with the fixed pin of an outer diameter of 5 mm at an angle θ=(152/180) radian (152°), and moved and rubbed at a speed of 3.3 cm/sec. The tension controller 2 is adjusted so that entrance tension (T1) becomes 30 g, the film is run by 10m and rewound, and again running is repeated. This reciprocation is counted once.

1) Abrasion Resistance

It is observed whether there is a substance deposited on the fixed pin after 30 times repeated running, and evaluation is made according to the following criterion:

○: deposit is scarcely observed

Δ: there are signs of some adhesion

X: there are signs of much adhesion

2) Scratch Resistance

The friction state (degree of occurrence of scratch) of the film surface after 30 times repeated running is observed, and evaluated by the following criterion:

○: scratch is scarcely observed

X: considerable degree of scratch occurs (7) Electromagnetic Conversion Characteristics A film is wound along with a cylindrical can having a diameter of 1m, a Co-Ni alloy (containing 20 wt % Ni) is rhombicly vapor deposited to a membrane thickness about 1500 Å at a minimal angle of incidence of 43° in $5\times10^{-5}$ (Torr) of oxygen, and thereafter, the film is slitted to a breadth of 8 mm to prepare a magnetic tape. Using this magnetic tape, high density recording characteristics, particularly magnitude of noise level and evaluated based on the S/N (dB) ratio at the time of 10 KBPI recording and reproduction and the lowering rate of the output at the time of 50 KBPI recording and reproduction against the output at the time of 10 KBPI recording and reproduction:

S/N (dB) at the time of 10 KBPI recording and reproduction

○: 45 dB or more

X: under 45 dB

Output lower rate

A=(output at the time of 10 KBPI recording and reproduction)/(output at the time of 50 KBPI recording and reproduction)

○: A is under 10

X: A is 10 or more (8) Tape Running Properties

Picture recording and reproduction are repeated under two kinds of conditions, namely at ordinary temperature and ordinary humidity, and at a high temperature and a high humidity using a 8 mm, VCR (Video Cassette Recorder) generally on the market, and fluctuation of the image due to turbulence of tape running at that time is observed. The evaluation criterion is as follows:

○: running is smooth and there is no fluctuation of reproduction evaluation

X: running becomes late here and there, and fluctuation of reproduced image occurs (9) Scuff Resistance (Adhesion)

Evaluation of scuff resistance is carried out by observation of scuffs on the thin membrane of a tape after 100 times repeated running under conditions of ordinary temperature and ordinary humidity as well as a high temperature and a high humidity. The evaluation criterion is as follows:

⊚: occurrence of scuffs is scarcely observed on the thin membrane surface of the tape ○: a little occurrence of extremely weak scuffs is observed on the thin membrane surface of the tape X: intense scuffs occur on the thin membrane surface of the tape In the above, the conditions of ordinary temperature and ordinary humidity is 25° C. and 60% RH, and the condition of a high temperature and a high humidity is 40° C. and 80% RH.

(10) Tape Durability in Preservation

A 0.5% myristic acid/isopropyl alcohol solution is applied onto the tape surface in a quantity of 10 g/m², the resultant tape is air dried at ordinary temperature and held at 60° C. and 90% RH for 24 hours, and then the degree of deformation of the tape surface is observed and evaluated by a microscope (magnification: 200-fold or 400-fold). The evaluation criterion is as follows:

○: the tape surface is not deformed at all even by observation at 400-fold

Δ: Although no deformation of the tape surface is found by observation at 200-fold, small deformation is found by observation at 400-fold X: deformation of the tape surface is found by observation at 200-fold

EXAMPLES

Hereafter, this invention is further described by examples. The "parts" in examples mean weight parts.

Example 1

0.019 part of manganese acetate tetrahydrate and 0.013 part of sodium acetate trihydrate were charged, together with 100 parts of dimethyl terephthalate and 70 parts of ethylene glycol, into a reactor, and transesterification reaction was carried out with gradual rise of the inner temperature from 145° C. When the conversion of transesterification became 95%, thereto was added as a stabilizer 0.044 part of a glycol solution of a phosphorus compound previously obtained by reaction of 25 parts of trimethyl phosphate and 75 parts of ethylene glycol. Further, thereto was added as a polymerization catalyst 0.011 part of a liquid (titanium content: 11 weight %) previously obtained by dissolving 0.8 part of trimellitic anhydride in 2.5 parts of ethylene glycol and adding dropwise thereto 0.65 part of tetrabutyl titanate to carry out reaction. Then the reaction product was transferred into a polymerization reactor and subjected to polycondensation reaction under a high temperature and vacuum (final inner temperature: 290° C.) to obtain polyethylene terephthalate having an intrinsic viscosity of 0.60.

This polyethylene terephthalate was melt-extruded according to a conventional method, and rapidly cooled to prepare an unstretched film having a thickness of 131 μm. This unstretched film was subjected to consecutive biaxial stretching of 3.6-fold at 90° C. in the longitudinal direction and then 3.7-fold at 105° C. in the transverse direction, and further, heat-set at 205° C. for 30 seconds to prepare a biaxially oriented film having a thickness of 9.8 μm.

In the above, a coating liquid having the following composition was applied on the surface (one side) of the monoaxially stretched film before the transverse stretching by a roll coating method.

Composition of the Coating Liquid Applied onto the Film Surface

| | |
|---|---|
| A 0.5 wt % water-dispersion of fine particles consisting of crosslinked acrylic spherical particles having an average particle size of 0.025 μm coated with a polyester resin | 40.0 parts |
| A 0.5 wt % aqueous solution of polyethylene nonylphenyl ether (NS 208.5 produced by Nippon Oils and Fats Co., Ltd.) | 60.0 parts |

The applied quantity was 0.5 g/m² on the basis of wet weight.

In Table 1 are shown characteristics of the obtained polyester film and a magnetic recording medium wherein a magnetic layer was provided on the coated surface.

When the coated surface of the film was observed by a scanning type electron microscope, protuberances not containing fine particles respectively were not substantially observed.

Example 2

The procedure of Example 1 was repeated except that a coating liquid having the following composition was applied onto the surfaces (A) and (B) of the monoaxially stretched film before the transverse stretching by a roll coating method. Surface (A) forms the first surface and surface (B) the second surface.

Composition of the Coating Liquid Applied onto the Film Surface (A)

| | |
|---|---|
| A 0.1 wt % water-dispersion of fine particles consisting of silica fine particles having an average particle size of 0.04 μm coated with an acrylic resin | 30.0 parts |
| A 0.1 wt % aqueous solution of polyoxyethylene nonylphenyl ether (NS 208.5 produced by Nippon Oils and Fats Co., Ltd.) | 70.0 parts |

The applied quantity was 0.12 g/m² on the basis of wet weight.

Composition of the Coating Liquid Applied onto the Film Surface (B)

| | |
|---|---|
| A 2.0 wt % aqueous solution of an acrylicpolyester resin (Pesresin SH 551 produced by Takamatsu Oils and Fats Co., Ltd.) | 56.7 parts |
| A 2.0 wt % aqueous solution of a cellulose resin (Methylcellulose SM-15 produced by Shin-Etsu Chemical Co., Ltd.) | 24.3 parts |
| A 2.0 wt % water-dispersion of fine particles of polymethyl methacrylate (Eposter MA produced by Nippon Shokubai CO., LTD.) | 9.0 parts |
| A 2.0 wt % aqueous solution of polyoxyethylene nonylphenyl ether (NS 208.5 produced by Nippon Oils and Fats Co., Ltd.) | 10.0 parts |

The applied quantity was 4.2 g/m² on the basis of wet weight.

In Table 1 are shown characteristics of the obtained polyester film and a magnetic recording medium wherein a magnetic layer was provided on the first surface of this film.

When the first surface (the coated surface) of film was observed by a scanning type electron microscope, protuberances not containing fine particles respectively were not substantially observed.

Example 3

The procedure of Example 1 was repeated except that 0.0107 part of germanium dioxide was used as a polymerization catalyst to obtain polyethylene terephthalate (A) having an intrinsic viscosity of 0.60.

0.040 part of manganese acetate tetrahydrate was charged, together with 100 parts of dimethyl terephthalate and 70 parts of ethylene glycol, into a reactor, and transesterification reaction was carried out with gradual rise of the inner temperature from 145° C. When the conversion of transesterification became 97%, 0.100 part of a glycol solution of a phosphorus compound previously obtained by reaction of 25 parts of trimethyl phosphate with 75 parts of ethylene glycol was added as a stabilizer, and then 0.045 part of antimony trioxide was added as a polymerization catalyst. Five minutes thereafter, 0.10 parts of calcium carbonate having an average particle size of 0.35 μm was added, and then the reaction product was transferred into a polymerization reactor and subjected to polycondensation reaction under a high temperature and vacuum (final inner temperature: 290° C.) to obtain polyethylene terephthalate (B) having an intrinsic viscosity of 0.65.

These polyethylene terephthalates (A) and (B) were melt co-extruded in a rate of thickness ratio 8:2 and rapidly cooled to prepare an unstretched film having a thickness of 96 μm. The unstretched film was subjected to consecutive biaxial stretching of 3.6-fold at 95° C. in the longitudinal direction and 3.7-fold at 110° C. in the transverse direction, and further heat-set at 205° C. for 30 seconds to prepare a biaxially oriented film having a thickness of 7.1 μm. In the above, a coating liquid having the following composition was applied, by a roll coating method, onto the outer surface of polyethylene terephthalate (A) of the monoaxially stretched film before the transverse stretching.

Composition of the Coating Liquid Applied onto the Film Surface

| | |
|---|---|
| A 0.7 wt % water-dispersion of fine particles consisting of silicone tabular particles having an average particle size of 0.05 μm coated with a polyurethane resin | 50.0 parts |
| A 0.7 wt % aqueous solution of polyoxyethylene nonylphenyl ether (NS 240 produced by Nippon Oils and Fats Co., Ltd.) | 50.0 parts |

The applied quantity was 1.0 g/m² on the basis of wet weight.

In Table 1 are shown characteristics of the obtained polyester film and a magnetic recording medium wherein a magnetic layer was provided on the outer surface of polyethylene terephthalate (A) of this film.

When the outer surface (the coated surface) of polyethylene terephthalate (A) was observed by a scanning type electron microscope, protuberances not containing fine particles respectively were not substantially observed.

Example 4

A mixture of 100 parts of bis-β-hydroxyethyl ester of terephthalic acid, 65 parts of terephthalic acid and 29 parts of ethylene glycol was subjected to esterification reaction at temperatures of 210° to 230° C. When the quantity of water formed by the reaction and distilled out became 13 parts, reaction was completed and 0.0067 part of titanium acetate was added per 100 parts of the reaction product. The resultant reaction product was transferred into a polymerization reactor, 0.11 part of an ethylene glycol slurry of silicon dioxide having an average particle size of 0.015 μm (10 wt % liquid) was added, and the mixture was subjected to polycondensation reaction under a high temperature and vacuum (final inner temperature: 285° C.) to obtain polyethylene terephthalate having an intrinsic viscosity of 0.60.

According to conventional methods, this polyethylene terephthalate was melt-extruded and rapidly cooled to prepare an unstretched film having a thickness of 96 μm. The unstretched film was subjected to consecutive biaxial stretching of 3.6-fold at 90° C. in the longitudinal direction and 3.7-fold at 105° C. in the transverse direction, and further subjected to heat-setting at 205° C. for 30 seconds to prepare a biaxially oriented film having a thickness of 7.1 μm. Thereafter, a coating liquid having the following composition was applied onto the film by a roll coating method, and the resultant film was heat treated for 10 seconds with hot air of 130° C.

Composition of a Coating Liquid Applied onto the Film Surface

| | |
|---|---|
| Fine particles consisting of polystyrene spherical fine particles having an average particle size of 0.04 μm coated with a polyvinyl acetate resin | 40.0 parts |
| Xylene | 58.0 parts |
| Methyl ethyl ketone | 2.0 parts |

The applied quantity was 0.2 g/m² on the basis of wet weight.

In Table 1 are shown characteristics of the obtained polyester film and a magnetic recording medium wherein a magnetic layer was provided on this film.

When the coated surface of the film was observed by a scanning type electron microscope, protuberances not containing fine particles respectively were not substantially observed.

Example 5

0.021 part of manganese salicylate and 0.005 part of potassium acetate were added to a mixture of 100 parts of dimethyl 2,6-naphthalenedicarboxylate and 60 parts of ethylene glycol, and further, 0.007 part of titanium oxalate was added, and transesterification reaction was carried out with gradual rise of temperature from 150° C. to 240° C. When the conversion of transesterification reached 92%, 0.032 parts of a mixed liquid previously obtained by reaction of 25 parts of trimethyl phosphate and 75 parts of ethylene glycol was added as a stabilizer in a state of a liquid temperature of 140° C., and further, 0.200 part of an ethylene glycol slurry of silicon dioxide having an average particle size of 0.010 μm (10 wt %) was added. Then, the reaction product was transferred into a polymerization reactor and subjected to polycondensation reaction under a high temperature and vacuum (final inner temperature: 280° C.) to obtain polyethlene- 2,6-naphthalate having an intrinsic viscosity of 0.57.

According to conventional methods, this polyethylene-2,6-naphthalate was melt-extruded and rapidly cooled to prepare an unstretched film having a thickness of 60 μm, and the unstretched film was subjected to consecutive biaxial stretching of 4.0-fold at 135° C. in the longitudinal direction and 3.8-fold at 145° C. in the transverse direction and further subjected to heat-setting at 210° C. for 30 seconds to prepare a biaxially oriented film having a thickness of 4.0 μm. In the above, a coating liquid having the following composition was applied onto the surface of the monoaxially stretched film before the transverse stretching by a roll coating method.

Composition of a Coating Liquid Applied onto the Film Surface

| | |
|---|---|
| A 0.4 wt % water-dispersion of fine particles consisting of tabular titanium oxide fine particles having an average particle size of 0.03 μm coated with an epoxy resin | 40.0 parts |
| A 0.4 wt % aqueous solution of polyoxyethylene nonylphenyl ether (NS 240 produced by Nippon Oils and Fats Co., Ltd.) | 60.0 parts |

The applied quantity was 1.0 g/m² on the basis of wet weight.

In Table 1 are shown characteristics of the resultant polyester film and a magnetic recording medium wherein a magnetic layer was provided thereon.

When the coated surface of the film was observed by a scanning type electron microscope, protuberances not containing fine particles respectively were not substantially found.

Comparative Example 1

The procedure of Example 1 was repeated except that the coating liquid applied onto the polyethylene terephthalate film was changed as follows to obtain a film.

Composition of a Coating Liquid Applied onto the Film Surface

| | |
|---|---|
| A 0.03 wt % water-dispersion of fine particles consisting of crosslinked acrylic spherical fine particles having an average particle size of 0.07 μm coated with a polyester | 40.0 parts |
| A 0.03 wt % aqueous solution of polyoxyethylene nonylphenyl ether (NS 208.5 produced by Nippon Oils and Fats Co., Ltd.) | 60.0 parts |

The applied quantity was 0.05 g/m² on the basis of wet weight.

In Table 1 are shown characteristics of the resultant polyester film and a magnetic recording medium wherein a magnetic layer was provided on the surface of this film.

Comparative Example 2

The procedure of Example 1 was repeated except that after the addition of the polymerization catalyst was further added 4.5 parts of a 10 wt % ethylene glycol slurry of calcium carbonate having an average particle size of 0.7 μm, whereby was obtained polyethylene terephthalate having an intrinsic viscosity of 0.60.

According to conventional methods, this polyethylene terephthalate was melt-extruded and rapidly cooled to prepare an unstretched film having a thickness of 131 μm, and then, the unstretched film was subjected to consecutive biaxial stretching of 3.6-fold at 90° C. in the longitudinal direction and 3.7-fold at 105° C. in the transverse direction, and further subjected to heat-setting at 205° C. for 30 seconds to prepare a biaxially oriented film having a thickness of 9.8 μm. In the above, a coating liquid having the following composition was applied by a roll coating method onto the surface of the monoaxially stretched film before the transverse stretching.

Composition of the Coating Liquid Applied onto the Film Surface

| | |
|---|---|
| A 0.6 wt % water-dispersion of fine particles consisting of crosslinked acrylic spherical particles having an average particle size of 0.030 μm coated with a polyester resin | 40.0 parts |
| A 0.6 wt % aqueous solution of polyoxyethylene nonylphenyl ether (NS 208.5 produced by Nippon Oil and Fats Co., Ltd.) | 60.0 parts |

The applied quantity was 0.5 g/m² on the basis of wet weight.

In Table 1 are shown characteristics of the resultant polyester film and a magnetic recording medium wherein a magnetic layer was provided on the surface of this film.

Comparative Example 3

The procedure of Example 1 was repeated except that the coating liquid applied onto the film surface was changed as follows.

Composition of the Coating Liquid Applied onto the Film Surface

| | |
|---|---|
| A 20.0 wt % water-dispersion of fine particles consisting of silica fine particles having an average particle size of 0.03 μm coated with an acrylic resin | 50.0 parts |
| A 20.0 wt % aqueous solution of polyoxyethylene nonylphenyl ether (NS 208.5 produced by Nippon Oils and Fats Co., Ltd.) | 50.0 parts |

The applied quantity was 70 g/m² on the basis of wet weight.

In Table 1 are shown characteristics of the resultant polyester film and a magnetic recording medium wherein a magnetic layer was provided on the surface of this film.

Comparative Example 4

The procedure of Example 1 was repeated except that 0.20 part of a 10 wt % ethylene glycol slurry of silicon dioxide having an average particle size of 0.25 μm was further added after the addition of the polymerization catalyst, whereby was obtained polyethylene terephthalate having an intrinsic viscosity of 0.60.

According to conventional methods, this polyethylene terephthalate was melt-extruded and rapidly cooled to prepare an unstretched film having a thickness of 131 μm, and the unstretched film was subjected to consecutive biaxial stretching of 3.6-fold at 90° C. in the longitudinal direction and 3.7-fold at 105° C. in the transverse direction and further subjected to heat-setting at 205° C. for 30 seconds to prepare a biaxially oriented film having a thickness of 9.8 μm. In the above, a coating liquid having the following composition was applied onto the surface of the monoaxially stretched film before the transverse stretching.

Composition of the Coating Liquid Applied onto the Film Surface

| | |
|---|---|
| A 1.5 wt % aqueous solution of an acrylicpolyester resin (Pesresin SH 551 produced by Takamatsu Oil and Fat Co., Ltd.) | 75.0 parts |
| A 1.5 wt % water-dispersion of silica fine particles having an average particle size | 10.0 parts |
| A 1.5 wt % aqueous solution of polyoxyethylene nonylphenyl ether (NS 240 produced by Nippon Oils and Fats Co., Ltd.) | 15.0 parts |

The applied quantity was 3.0 g/m² on the basis of wet weight.

In Table 1 are shown characteristics of the resultant polyester film and a magnetic recording medium wherein a magnetic layer was provided on the surface of this film.

When the coated surface of this film was observed by a scanning type electron microscope, a lot of protuberances (length: about 0.03 μm) not containing silica fine particles respectively were found in addition to protuberances containing silica fine particles respectively.

Comparative Example 5

The procedure of Example 1 was repeated except that the coating liquid applied onto the film surface was changed as follows.

Composition of the Coating Liquid Applied onto the Film Surface

| | |
|---|---|
| A 5.0 wt % water-dispersion of fine particles consisting of calcium carbonate particles having an average particle size of 0.25 μm with an acrylic resin | 70.0 parts |
| A 5.0 wt % aqueous solution of polyoxyethylene nonylphenyl ether (NS 208.5 produced by Nippon Oils and Fats Co., Ltd.) | 30.0 parts |

The applied quantity was 30 g/m² on the basis of wet weight.

In Table 1 are shown characteristics of the resultant polyester film and a magnetic recording medium wherein a magnetic layer was provided on the surface of this film.

| Average particle size of fine particles as nuclei (μm) | Number of protuberances on the film surface (g/mm²) | Surface roughness (μm) | Film friction coefficient | Running durability | |
|---|---|---|---|---|---|
| | | | | Chipping properties | Scratch resistance |

-continued

| | | | | | | |
|---|---|---|---|---|---|---|
| Example 1 | 0.025 | $5.0 \times 10^7$ | 0.0013 | ○ | ○ | ○ |
| Example 2 | 0.04 | $8.0 \times 10^5$ | 0.0012 | ○ | ○ | ○ |
| Example 3 | 0.05 | $4.0 \times 10^5$ | 0.0012 | ○ | ○ | ○ |
| Example 4 | 0.04 | $4.0 \times 10^7$ | 0.0035 | ○ | ○ | ○ |
| Example 5 | 0.03 | $8.0 \times 10^6$ | 0.0050 | ○ | ○ | ○ |
| Comparative Example 1 | 0.07 | $3.0 \times 10^3$ | 0.0013 | X | X | ○ |
| Comparative Example 2 | 0.03 | $2.0 \times 10^7$ | 0.040 | ○ | ○ | ○ |
| Comparative Example 3 | 0.03 | $2.0 \times 10^{11}$ | 0.0050 | ○ | X | ○ |
| Comparative Example 4 | 0.03 | $9.0 \times 10^7$ | 0.0080 | ○ | X | ○ |
| Comparative Example 5 | 0.25 | $2.0 \times 10^6$ | 0.080 | ○ | X | ○ |

| | Magnetic recording medium | | | | |
|---|---|---|---|---|---|
| | S/N | Rate of Output lowering | Running properties | Scuff resistance | Durability in preservation |
| Example 1 | ○ | ○ | ○ | ⊙ | ○ |
| Example 2 | ○ | ○ | ○ | ○ | ○ |
| Example 3 | ○ | ○ | ○ | ⊙ | ○ |
| Example 4 | ○ | ○ | ○ | ⊙ | ○ |
| Example 5 | ○ | ○ | ○ | ⊙ | ○ |
| Comparative Example 1 | ○ | ○ | X | X | ○ |
| Comparative Example 2 | X | X | ○ | ⊙ | ○ |
| Comparative Example 3 | X | ○ | ○ | ⊙ | Δ |
| Comparative Example 4 | X | ○ | ○ | ○ | X |
| Comparative Example 5 | X | X | ○ | X | X |

We claim:

1. A polyester film for magnetic recording media having fine protuberances on the film surface of one or both sides of the polyester film, the protuberances comprising fine particles coated with a binder resin with which the protuberances are bound to the film surface, wherein:

(i) the binder resin is substantially confined to areas of the film surface where the fine protuberances exist such that other areas of the film surface are substantially free of binder resin;

(ii) the fine protuberances are bound to the film surface at a density of $1.0 \times 10^4$ to $1.0 \times 10^8$ per mm$^2$ and have an average height of 0.15 μm or less; and (iii) the polyester film possesses a centerline average surface roughness (Ra) in the range of 0.001 to 0.01 μm.

2. The film of claim 1 wherein the average height of the fine protuberances on the film surface is 0.1 μm or less.

3. The film of claim 1 wherein the fine protuberances are bound to the film surface at a density of $1.0 \times 10^5$ to $8 \times 10^7$ per mm$^2$.

4. The film of claim 1 wherein the particles are such that the relative standard deviation value of their particle sizes is 0.5 or less.

5. The film of claim 1 wherein the particles have an average particle size of 0.1 μm or less.

6. The film of claim 1 wherein the centerline average surface roughness (Ra) of the film surface is in the range of 0.001 to 0.007 μm.

7. The film of claim 1 wherein the binder resin has a softening point of 80° to 240° C.

8. A magnetic recording medium which comprises the polyester film of claim 1 having a ferromagnetic metallic membrane formed thereon and over the protuberances on the side or sides of the polyester film on which said protuberances are formed.

9. The magnetic recording medium of claim 8 wherein the ferromagnetic metallic membrane has a thickness of 0.01 to 0.6 μm.

10. The magnetic recording medium of claim 8 wherein the ferromagnetic metallic membrane is composed of cobalt or a cobalt alloy.

* * * * *